(12) United States Patent
Chang

(10) Patent No.: US 8,403,516 B2
(45) Date of Patent: Mar. 26, 2013

(54) SOLAR SHUTTER

(75) Inventor: Kuo-Cheng Chang, Miao-Li Hsien (TW)

(73) Assignee: Foxsemicon Integrated Technology, Inc., Chu-Nan, Miao-Li Hsien (TW)

( * ) Notice: Subject to any disclaimer, the term of this patent is extended or adjusted under 35 U.S.C. 154(b) by 399 days.

(21) Appl. No.: 12/903,124

(22) Filed: Oct. 12, 2010

(65) Prior Publication Data

US 2012/0048262 A1   Mar. 1, 2012

(30) Foreign Application Priority Data

Aug. 30, 2010   (TW) .............................. 99129001 A

(51) Int. Cl.
*F21L 4/00* (2006.01)

(52) U.S. Cl. .................. 362/145; 362/183; 362/249.02; 362/249.03; 362/311.02; 362/285

(58) Field of Classification Search .................. 362/145, 362/147, 576, 183, 249.02, 249.03, 249.1, 362/311.02, 230, 231, 285, 287, 418, 427, 362/430, 800; 126/702; 52/28; 160/10, 160/127, 236

See application file for complete search history.

(56) References Cited

U.S. PATENT DOCUMENTS

| | | | | |
|---|---|---|---|---|
| 4,636,579 A * | 1/1987 | Hanak et al. | .................. | 136/245 |
| 7,438,434 B2 * | 10/2008 | Prince et al. | .................. | 362/152 |
| 7,617,857 B2 * | 11/2009 | Froese | .............................. | 160/10 |
| 2007/0175599 A1 * | 8/2007 | Froese | .................. | 160/168.1 R |
| 2008/0198584 A1 * | 8/2008 | Fouraux et al. | ............... | 362/147 |
| 2008/0285294 A1 * | 11/2008 | Kim | ............................... | 362/487 |
| 2009/0059574 A1 * | 3/2009 | Lewis et al. | .................... | 362/183 |

* cited by examiner

*Primary Examiner* — Bao Q Truong
(74) *Attorney, Agent, or Firm* — Altis Law Group, Inc.

(57) ABSTRACT

A solar shutter includes a frame, a plurality of slats pivotably attached within the frame, a plurality of solar cells mounted on the slats and multiple LEDs. The frame has a power storage apparatus for storing power absorbed by the solar cells. Each slat includes a base and a light pervious cover fixed on the base. In an embodiment, the LEDs are mounted on the frame to face opposite ends of the cover. In a further embodiment, the LEDs are mounted on the bases within the slats. The light emitted from the LEDs is radiated into an inside of a building through the covers.

17 Claims, 5 Drawing Sheets

SOLAR SHUTTER

BACKGROUND

1. Technical Field

The present disclosure relates to a solar shutter, and more particularly, to a solar shutter incorporating illumination function.

2. Description of Related Art

With the energy crises created by the impact of consumption of non-renewable natural resources, together with a new emphasis in establishing low-carbon-standards associated with the usage of such natural resources, a considerable amount of effort has been directed to other forms of energy. Although there are several other forms of energy, the emphasis has been placed on solar energy at most logical less-pollution recyclable energy source. Nowadays there are various kinds of solar collection products available on the market.

However, most solar collection products in the market are designed to be installed on the roofs of buildings, it is desirable to mount the solar collection products on a variety of places for maximizing solar collection.

What is needed, therefore, is a solar shutter which can overcome the limitations described above.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1:
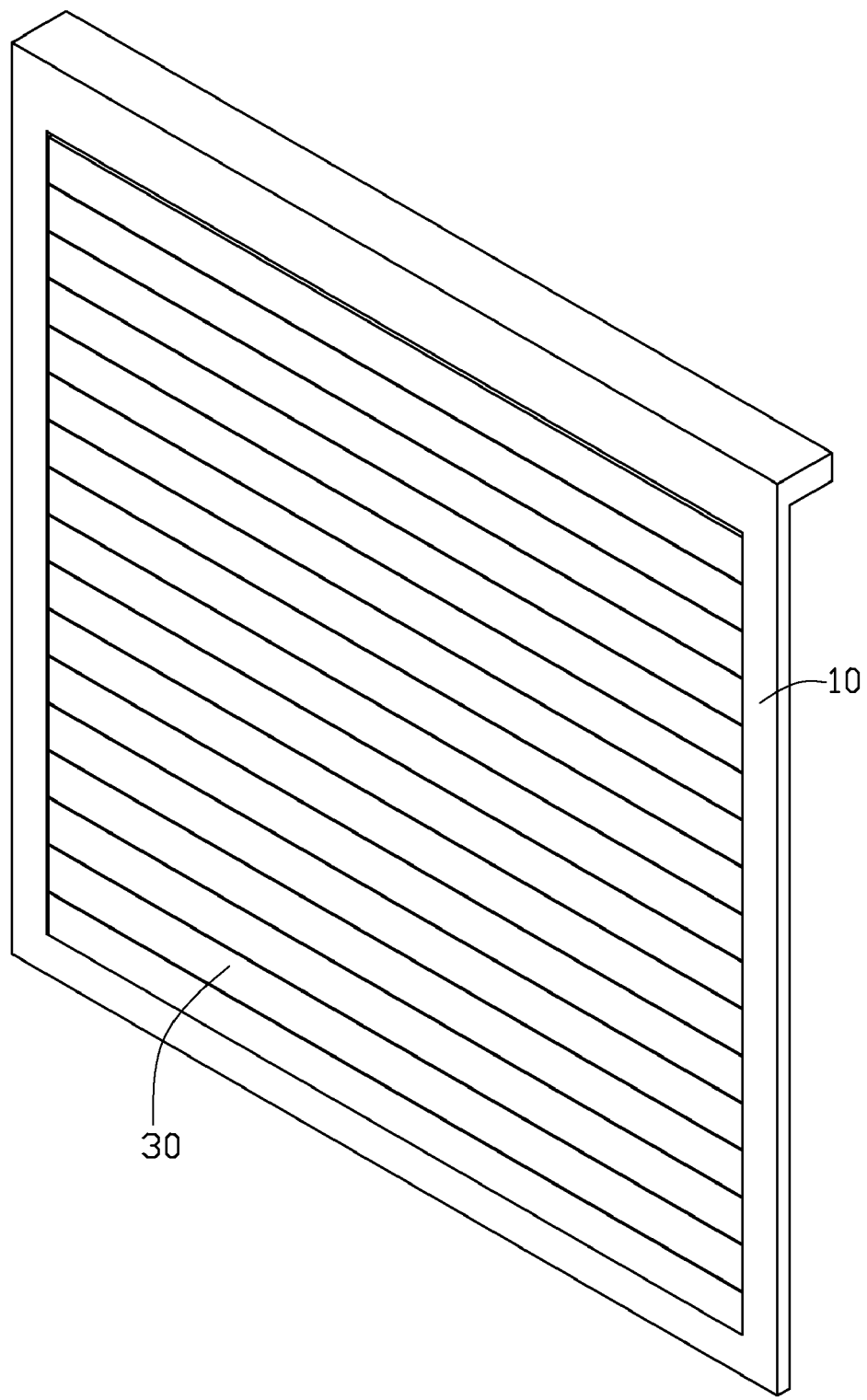
FIG. 1 is an exemplary view of a solar shutter of a first embodiment of the present disclosure.
Figure 2:
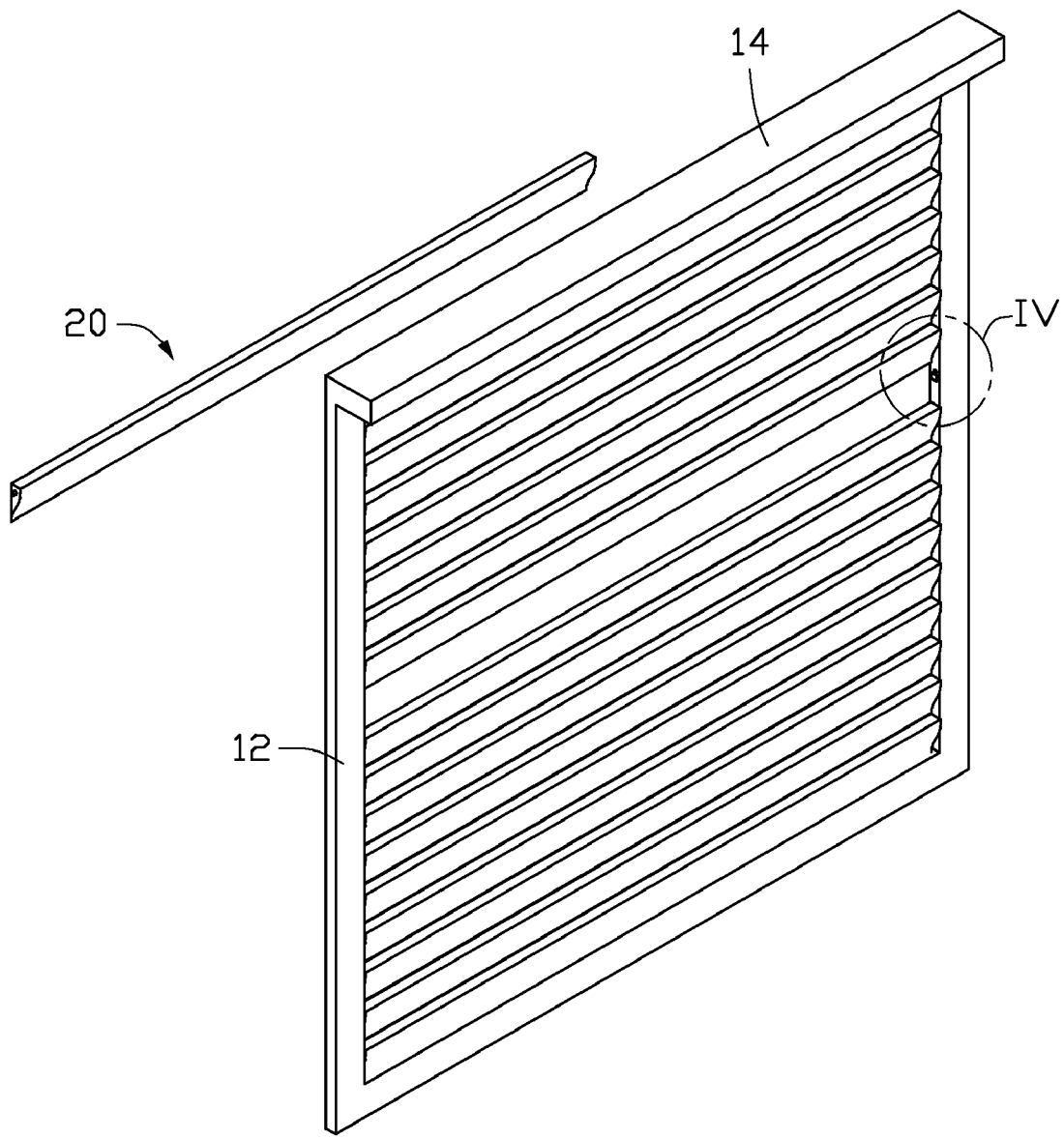
FIG. 2 is a view similar FIG. 1, but showing one slat of the solar shutter being separated from a frame of the solar shutter.
Figure 4:
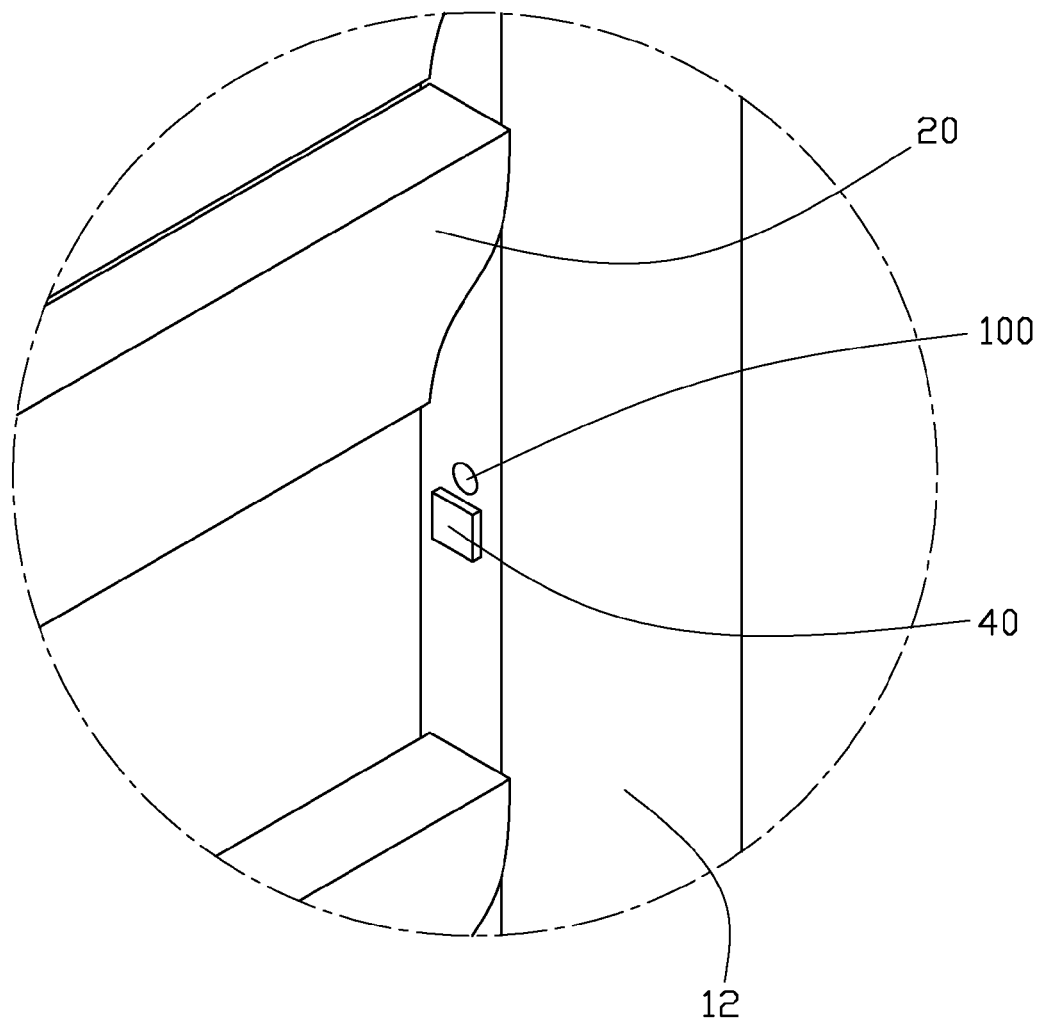
FIG. 4 is an enlarged view of part IV of the solar shutter of FIG. 2.

Referring to FIGS. 1-2 and 4, a solar shutter in accordance with a first embodiment of the present disclosure is shown. The solar shutter includes a frame 10, multiple slats 20 povitably mounted within the frame 10, a plurality of LEDs (light emitting diodes) 40 fixed on the frame 10 and a plurality of solar cells 30 fixed on the slats 20, respectively.

The frame 10 is used to be installed within an opening of a building (not shown) so that the solar shutter is employed as a window of the building. The frame 10 includes four straight beams 12 connected to each other from beginning to end to have a rectangular shape. A power storage apparatus 14 is formed inwardly from a top beam 12 of the frame 10 towards an inside of the building, whereby the solar storage apparatus 14 is prevented from damage by outside environmental condition, for example rainfall. The power storage apparatus 14 is electrically connected to the solar cells 30 and the LEDs 40. Two lateral beams 12 each define a plurality of pairs of holes 100 each corresponding to one slat 20. The LEDs 40 are secured on the two lateral beams 12 adjacent to the holes 100, respectively.

Figure 3:
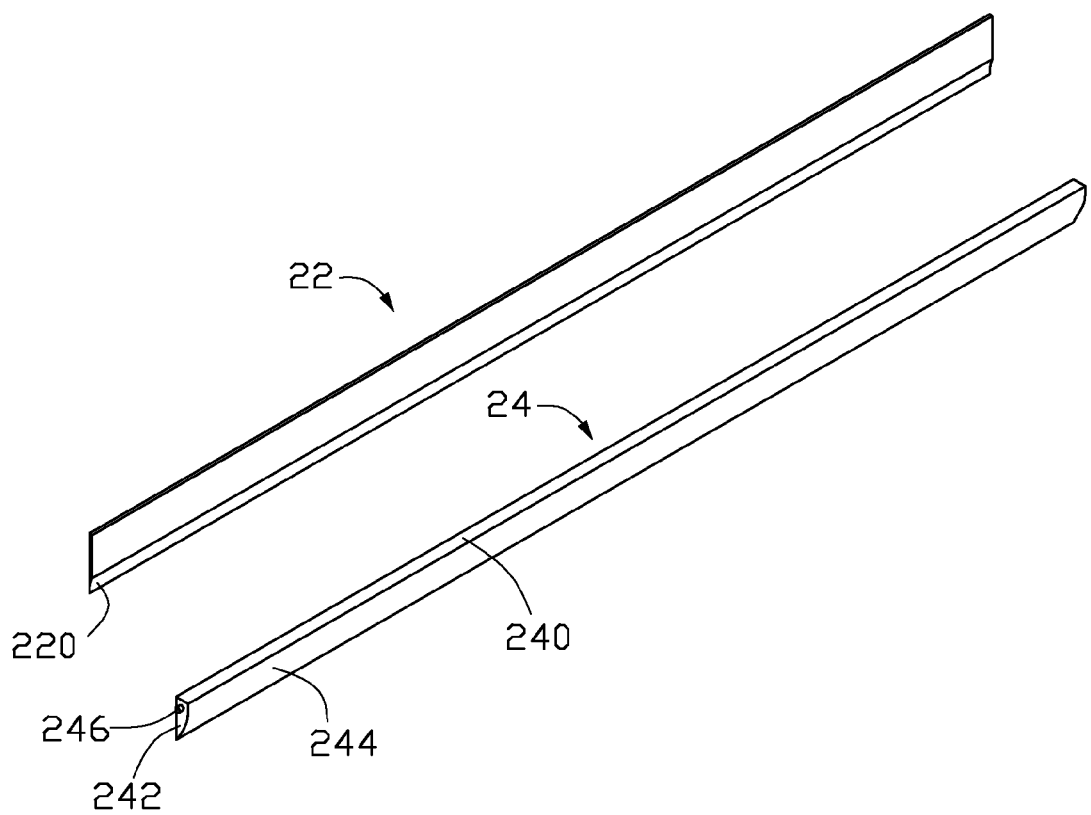
FIG. 3 is an exploded view of the slat of FIG. 2.

Also referring to FIG. 3, each slat 20 includes an opaque base 22 and a light pervious cover 24 fixed on the base 22. The base 22 is made by light material for facilitating rotation of the slat 20. The base 22 has a rectangular shape which is elongated along a horizontal direction parallel to the top beam 12. A thickness of a bottom end of the base 22 gradually decreases along a top-to-bottom direction to form a taper 220. A front face of the base 22 oriented towards the inside of the building is coated with a reflective material for reflecting light emitted from the LED 40; a back face of the base 22 oriented towards an outside of the building is adjoined with a corresponding solar cell 30 for absorbing sunlight from an outside environment. The sunlight absorbed by the solar cell 30 is converted to electrical power and stored in the power storage apparatus 14. The cover 24 is made of transparent/translucent material such as glass or plastic for allowing the light to pass therethrough. The cover 24 includes a top plate 240, a front plate 244 extending downwardly from the top plate 240 and two side plates 242 interconnecting the top plate 240 and the front plate 244. The top plate 240 has a width larger than a width of each LED 40. The front plate 244 is downwardly curved towards the base 22 to have a streamlining configuration. A front surface of the front plate 244 can be roughed or textured in order to diffuse light passing therethrough. Each side plate 242 is perpendicular to the front plate 244 and the top plate 240. Each side plate 242 is oriented facing a corresponding LED 40 to allow the light emitted from the LED 40 to transmit into the slat 242. A post 246 is extended outwardly from each side plate 242 towards the lateral beam 12 of the frame 10. The top plate 240 and the two side plates 242 abut against a periphery of the base 22 and the cover 24 is fixed with the base 22. The posts 246 of each slat 20 are inserted into two corresponding holes 100 in the lateral beams 12 to establish pivotable connection between each slat 20 and the frame 10. As the LED 40 is activated by the power storage apparatus 14, the light emitted by the LED 40 would be radiated through the side plates 242 into the slat 20. A part of light would directly transmit out of the slat 20 through the front plate 244, and remaining light would be reflected by the front face of the base 22 and then exit out of the slat 20 from the front plate 244. Therefore, the inside of the building is illuminated by the solar shutter. Furthermore, as rotation of the slats 20, the light output from the covers 244 of the slats 20 would be directed to various orientation, thereby producing different illumination effects in the building to meet different requirements.

Figure 5:
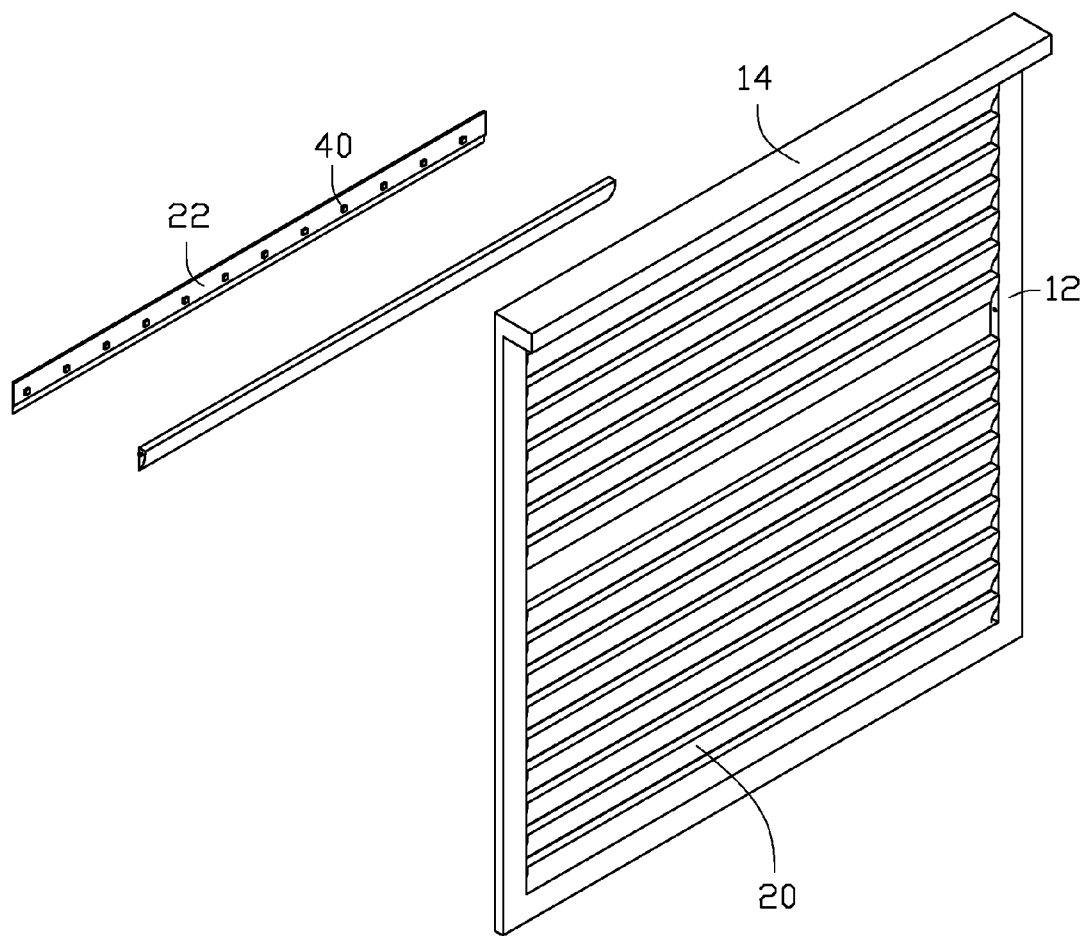
FIG. 5 shows a solar shutter of a second embodiment of the present disclosure.

Alternatively, the positions of the LEDs 40 can be varied according to different requirements. For example, the LEDs 40 can be mounted on the bases 22 to be received within the slats 20 as shown in FIG. 5. By placing the LEDs 40 within the slats 20, the light extracting efficiency of the solar shutter can be raised due to the light does not need to pass through the side plates 242 of the slats 20. Furthermore, the base 22 can provide sufficient areas for more LEDs 40 to be placed thereon, thereby increasing total intensity of the light output from the solar shutter. In both embodiments, a rear plate of the cover 24 opposite the front plate 244 is recessed so that a chamber is defined between the front plate 244, the side plates 242 and the top plate 240 and the base 22. In this second embodiment of FIG. 5, the LEDs 40 are received in the chamber. In the first embodiment, the LEDs 40 are located outside the chamber.

It is believed that the present disclosure and its advantages will be understood from the foregoing description, and it will be apparent that various changes may be made thereto without departing from the spirit and scope of the present disclosure or sacrificing all of its material advantages, the examples hereinbefore described merely being preferred or exemplary embodiments.

What is claimed is:

1. A solar shutter for being mounted in an opening of a building, the opening being configured for forming a window of the building, the solar shutter comprising:
    a frame configured to be fixed to a periphery of the opening, comprising a power storage apparatus;
    a plurality of slats pivotably mounted within the frame, each of the slats comprising a base and a light pervious cover fixed on the base;
    a plurality of solar cells connected to the bases, respectively; and
    a plurality of LEDs (light emitting diodes) electrically connected to the solar cells and the power storage apparatus;
    wherein light emitted from the LEDs is radiated through the covers in a direction away from the solar cells.

2. The solar shutter as claimed in claim 1, wherein the cover comprises a front plate and a pair of side plates connected to two opposite ends of the front plate, a chamber being defined between the base, the front plate and the side plates.

3. The solar shutter as claimed in claim 2, wherein side plates are oriented perpendicular to the front plate.

4. The solar shutter as claimed in claim 2, wherein the LEDs are located outside of the slats.

5. The solar shutter as claimed in claim 4, wherein the LEDs are mounted on the frame and oriented to face the side plates of the slats, respectively.

6. The solar shutter as claimed in claim 5, wherein the light emitted from the LEDs transmits through the side plates into the slats and then out of the slats from the front plates.

7. The solar shutter as claimed in claim 2, wherein the LEDs are mounted on the bases and received in the chambers, respectively.

8. The solar shutter as claimed in claim 7, wherein the light emitted from the LEDs directly transmits out of the slats through the front plates.

9. The solar shutter as claimed in claim 2, wherein each of the side plates forms a post inserted into the frame.

10. The solar shutter as claimed in claim 2, wherein the cover further comprises a top plate interconnecting the side plates and the front plate, the top plate being perpendicular to the side plates.

11. The solar shutter as claimed in claim 1, wherein the power storage apparatus is oriented towards the same direction as that of the light output from the covers.

12. A solar shutter comprising:
    a frame comprising a power storage apparatus;
    a plurality of slats pivotably mounted within the frame, each of the slats having a light pervious portion and an opaque portion;
    a plurality of solar cells mounted on the opaque portions of the slats, respectively; and
    a plurality of LEDs (light emitting diodes) electrically connected to the solar cells and the power storage apparatus;
    wherein light output out of the light pervious portions of the slats from the LEDs is directed to change orientations following rotation of the slats relative to the frame.

13. The solar shutter as claimed in claim 12, wherein the LEDs are located outside of the slats and fixed on the frame.

14. The solar shutter as claimed in claim 12, wherein the light pervious portion of each slat forms a post inserted into the frame.

15. The solar shutter as claimed in claim 14, wherein the LEDs are located adjacent to the posts of the slats, respectively.

16. The solar shutter as claimed in claim 12, wherein the LEDs are located inside of the slats and fixed on the opaque portions of the slats, respectively.

17. The solar shutter as claimed in claim 12, wherein the power storage apparatus is oriented towards a direction away from the solar cells.

* * * * *